(12) United States Patent
Savage et al.

(10) Patent No.: US 7,311,038 B2
(45) Date of Patent: Dec. 25, 2007

(54) FILTER SYSTEM FOR A DEEP FAT FRYER

(75) Inventors: Steven J. Savage, Concord, NH (US); Nathaniel A. Lambert, Hooksett, NH (US); Martin W. Lawrence, Chichester, NH (US); Robert L. Brown, Merrimack, NH (US)

(73) Assignee: Pitco Frialater, Inc., Concord, NH (US)

( * ) Notice: Subject to any disclaimer, the term of this patent is extended or adjusted under 35 U.S.C. 154(b) by 303 days.

(21) Appl. No.: 10/663,717

(22) Filed: Sep. 17, 2003

(65) Prior Publication Data

US 2005/0056157 A1    Mar. 17, 2005

(51) Int. Cl.
*A47J 37/12* (2006.01)
(52) U.S. Cl. ............... 99/408; 99/403; 210/DIG. 8
(58) Field of Classification Search ............ 99/330, 99/331, 336, 403–412; 210/167, 241, DIG. 8, 210/247, 258, 473, 791, 805, 196, 197, 411, 210/424, 257.1, 416.1, 428; 426/438, 523
See application file for complete search history.

(56) References Cited

U.S. PATENT DOCUMENTS 4,324,173 A    4/1982  Moore et al.
6,095,037 A    8/2000  Savage et al. ............... 99/408
6,196,118 B1   3/2001  Savage et al. ............... 99/403
6,254,790 B1   7/2001  Casey
6,365,046 B1   4/2002  Burke
6,378,420 B1*  4/2002  Savage et al. ............... 99/408

FOREIGN PATENT DOCUMENTS

GB    2281851 A    3/1995

OTHER PUBLICATIONS

European Patent Office Communication For EPO Application 04021450.4 dated Dec. 22, 2004.

* cited by examiner

*Primary Examiner*—Timothy F. Simone
(74) *Attorney, Agent, or Firm*—Brinks Hofer Gilson & Lione

(57) ABSTRACT

Improved features for a filter system for a deep fat fryer are described. The fryer includes a movable filter pan disposed below the cooking tank which is fed by gravity when the tank is drained through a downspout. The downspout is curved and rotatable from a down position when it is in use/storage to an up position when it is not in use and a stabilizing clip is mounted on the downspout to secure a separate polishing tube when it is in the down or horizontal position to allow one handle to lift two pipes at the same time for removal of the filter pan. An inline removable filter is provided in the oil return line, and the return line is slidably supported on the side of the filter pan so that it can rise and fall with the debris in the filter pan.

12 Claims, 6 Drawing Sheets

FILTER SYSTEM FOR A DEEP FAT FRYER

CROSS-REFERENCE TO RELATED APPLICATIONS

This application is related to U.S. patent application Ser. No. 09/821,801 filed Mar. 30, 2001, now U.S. Pat. No. 6,378,420, and assigned to the assignee of this invention. The disclosure of said patent is hereby incorporated by reference.

FIELD OF THE INVENTION

This invention relates to an improvement in a filter system for a commercial deep fat fryer which permits recycling and filtering of the cooking oil with only a minimum involvement of an operator.

DESCRIPTION OF THE PRIOR ART

Commercial deep fat frying units are required to process large quantities of, for example, batter coated chicken or fish, or french fries. In such operations, when food particles, batter, and the like fall off the food being cooked and if such debris remains in the cooking oil, the debris will affect the taste of the food being cooked.

Food items being cooked are placed in mesh baskets normally and immersed in the hot cooking oil. As the oil circulates through the food, particles become dislodged and drop out of the basket into the oil bath. It is necessary then to filter the oil from time to time. While the oil is being filtered or replaced the cooking unit will not be operational and therefore in a commercial setting, it is necessary to filter the oil as quickly as possible. In addition, working with hot oil can be hazardous to the operator and it is therefore necessary to have a filtering situation which involves a very minimal contact with an operator.

In some prior art fryers, a sump is provided below heat tubes which extend through the oil bath. Food is cooked above the heat tubes and dislodged particles and debris accumulate in the sump below. The sump area below the heat tube then is at a lower temperature than the cooking bath and unacceptable flavors can develop from the overcooked food particles in the sump.

In U.S. Pat. No. 6,095,037 assigned to the assignee of this invention there is described a continuous filtering system which includes a sump disposed beside the fryer tank so that oil from the surface of the tank will continuously spill over the edge of the tank into the sump whereupon it is recycled. This design adds to the horizontal dimensions of the fryer in that the sump is disposed beside the fry tank instead of below it. In fast food restaurants kitchen space is at a premium. Therefore, it normally would not be possible to replace a conventional fryer unit with an over sized unit because there would not be sufficient space to accommodate the unit. In U.S. Pat. No. 6,196,118, also assigned to the assignee of this invention there is described a deep fat fryer wherein the filter system is provided below the tank. In such a filter system it is desirable to remove the oil from the tank by gravity from the bottom of the tank and allow the oil to flow into a separate filter pump below the tank. The filtered oil is then pumped from the filter pump back into the tank. When it is desirable to change the oil the separate filter pump can be removed and the used oil pumped therefrom into a waste container for disposal. There is still a need, however, for improving the filter system so that it can more rapidly filter used oil and return it to the tank.

SUMMARY

It has been discovered that a simplified and efficient filter system can be provided for commercial deep fat fryers wherein the system includes a filter pan which is slidably disposed below the fryer tank with wheels mounted thereon so that when it is desired to clean the tank or removed the used oil for disposal, the filter pan can be slidably displaced outwardly from the fryer unit for access. The filter pan typically would have wheels on one end only so that it may be transported in a fashion similar to a suitcase. Tapered feet are provided at the end opposite the wheels and there typically would also be a handle adjacent to tapered feet.

In operation, the oil will flow downwardly into a filter, pass through the filter, and then be pumped from the bottom of the pan so that the food particles will be left as a cake on top of the filter which is horizontally disposed within the filter pan. Cleaning is then simplified by lifting the filter out of the pan to dump the waste food particles into a waste container for disposal.

Of the several improved features of embodiments of the instant invention which increase the simplicity and efficiency of the operation, a filter pick up tube which connects the filter and a pump to return filtered oil to the fryer is provided, and an inline strainer is disposed within the tube in order to eliminate any debris in the oil to be returned to the tank. The filter pick up tube is also received in a U-shaped guide bracket which holds the tube in position, but allows the pick up tube assembly and filter to float upward and downward as the tube is slidably received within the U-shaped bracket.

It is desirable to use filtered oil from time to time to wash dawn the sides of the tank. During this operation, the oil should be only minimally aerated as aerated oil will break down faster requiring more frequently replacement. A filter polish tube is provided, and in addition, an oil return spigot is also provided. In the case of the latter, the spigot is adjacent the flue pipe and therefore it is preferably double walled. The spigot is used to empty a minimal amount of oil pumped from the filter pan into a separate pan which is then used to rinse down the sides of the tank.

A clip member is provided on the rotatable drain downspout to capture or release the filter polish tube. Both the drain downspout and polish tube then can be raised with the handle as it is rotated to a substantially horizontal position permitting access to the filter pan, or the downspout can be rotated to an up position releasing the filter polish tube so that the downspout can be manually removed to clear a blockage.

Finally, a closed polishing circuit is provided wherein oil that has been filtered can be pumped directly to the polishing tube for return to the filter pan without going through the tank. An actuation switch located adjacent to the rotatable downspout is provided to initiate the closed polishing circuit. Actuation of the closed polishing circuit eliminates aeration of the oil as it is polished and it has been found that use of such a closed circuit substantially prolongs the life of the oil by returning the filtered oil to its initial condition.

Accordingly embodiments may provide an improved filter system for a deep fat fryer wherein an inline filter is provided in the oil return from the filter sump.

Embodiments may also provide a stabilizing bracket for the drain spigot so that it will be stabilized in the drain position and can be rotated Into a vertical position when not in use.

Embodiments may also provide a guide bracket for slidably receiving the filter pick up tube which allow the filter assembly to ride up and down floating with the oil filtered.

Embodiments may also provide an oil return spigot for removal of small quantities of filtered oil in a separate pan for use in rinsing the sides of the tank.

Some embodiments may provide a curved downspout, separate crumb tray, and baffle which will admit oil to be filtered in a uniform flow across the filter media to avoid displacement of filter aids located on the upper surface of the filter media itself so that the filter aids will not be washed away from the filter media by a direct discharge on to the surface of the oil to be filtered from the tank.

Some embodiments may provide a closed circuit for polishing the oil whereby oil can be pumped from the filter pan, and returned directly to the upper surface of the filter repeatedly without aerating the oil.

These and other advantages will become readily apparent with reference to the drawings and following description wherein:

DETAILED DESCRIPTION OF THE PRESENTLY PREFERRED EMBODIMENTS OF THE INVENTION

Figure 10:
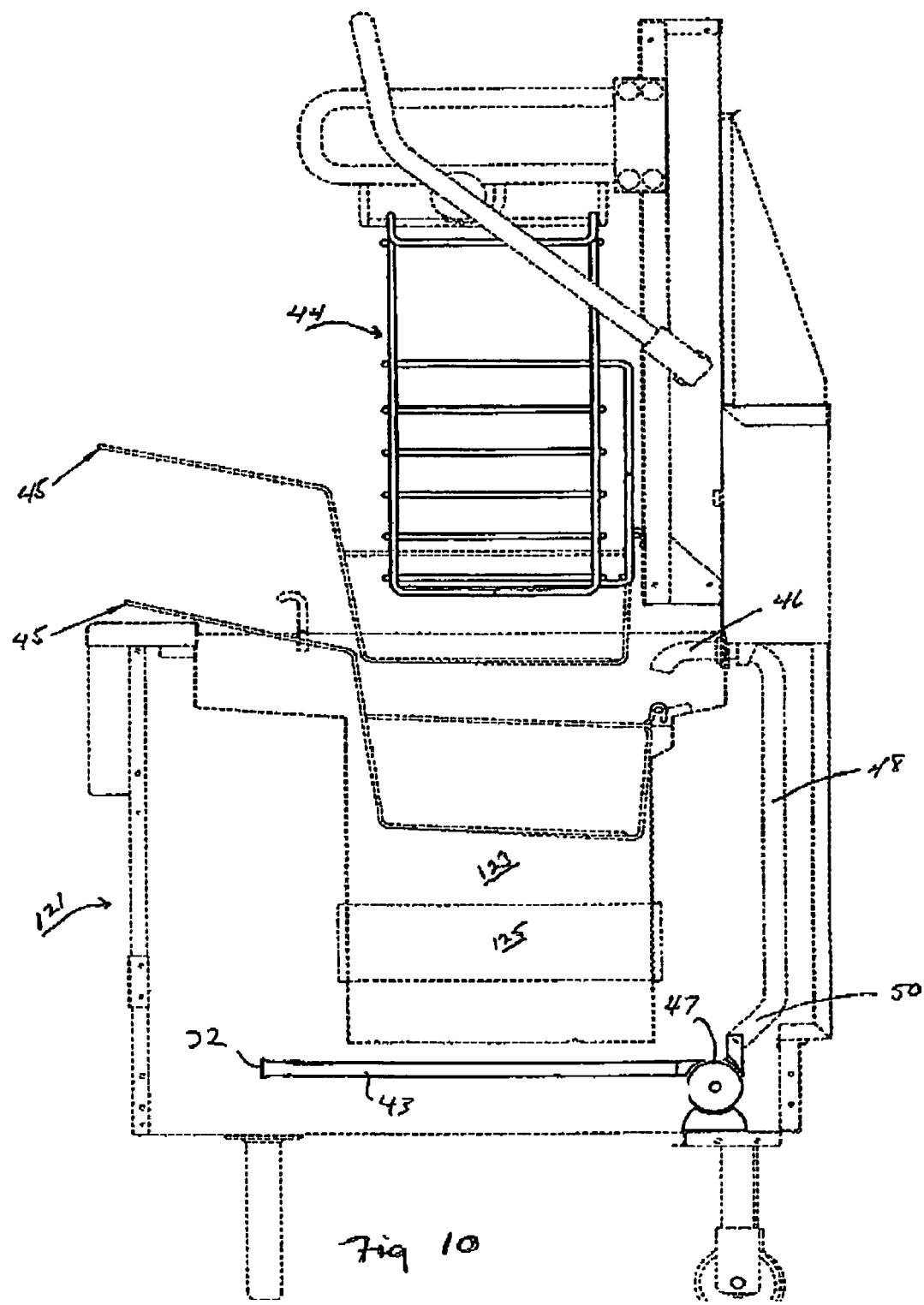
FIG. 10 is a side view of a typical fryer with a lifting mechanism, and with the filter pan and return pump removed.

As described in the above identified related patent, and as shown in FIG. 10 herein, a commercial deep fat fryer 121 has an open fry tank 123 with heat tubes 125 running therethrough as a source of heat for the cooking oil. Periodically the tank is drained by gravity into a filter pan 18 beneath the tank 123 and filtered. The filtered oil then is returned to the tank for reuse. While the tank typically drains by gravity, the filtered oil will be pumped back into the tank. One or a plurality of tanks can use the same filter pan so that oil in the tanks can be drained sequentially, filtered and returned.

Periodically the filter pan must be emptied as repeated use will cause the oil to break down and leave undesirable tastes in the food to be cooked. In the preferred embodiment, the filter pan has casters or wheels typically on one end and a handle on the opposite end so that on operator can withdraw the filter pan and wheel it to a disposal site.

With attention to FIGS. 1 and 2, a rotatable, curved downspout 10 is used to drain oil into a filter pan as will be subsequently explained. In the raised horizontal position shown in FIG. 2 the filter pan (not shown) can be rolled out from beneath the fryer for cleaning or disposal of waste oil. The downspout 10 in FIG. 2 is shown rotated to an extreme up position to allow downspout removal to clear a blockage. Downspout 10 is slidably mounted on conduit 11 to facilitate this removal, manually, without tools. In order to rotate the downspout 10, a handle 12 is provided as are a pair of opposed clips 14 which are intended to engage the polishing tube 16 when the downspout 10 is in the lower position of FIG. 1. Retainer clips 14 disengage from tube 16 when the downspout is rotated to the position of FIG. 2 so that the downspout 10 can be removed to clear a blockage.

Figure 1:
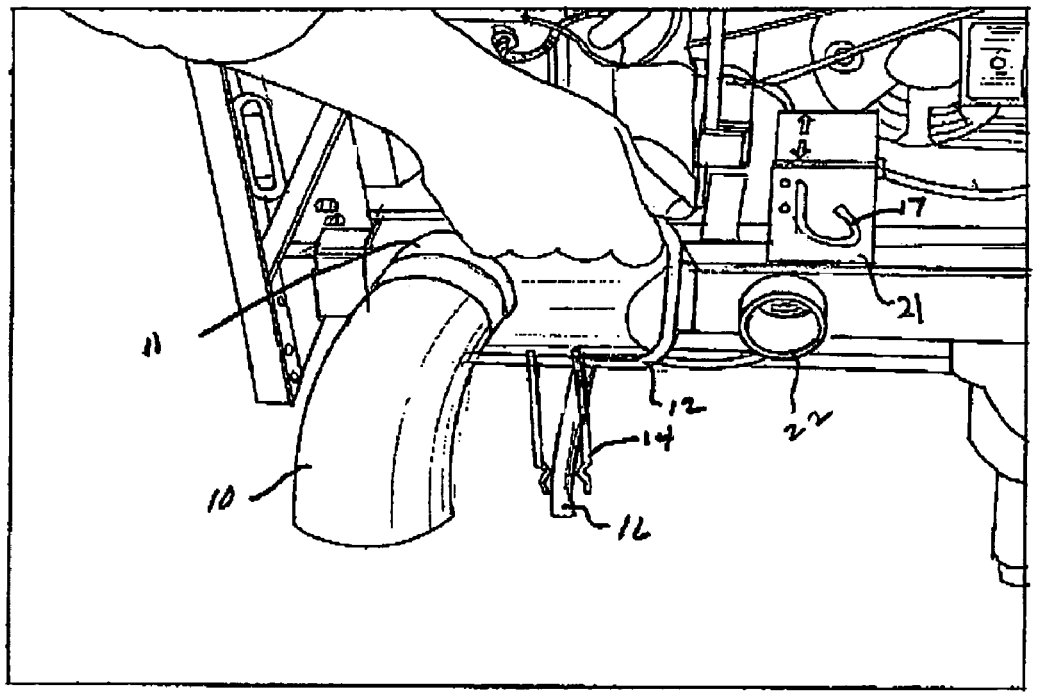
FIG. 1 is a fragmentary perspective view showing the stabilizing bracket used for stabilizing the slingable downspout in the lowered position.
Figure 2:
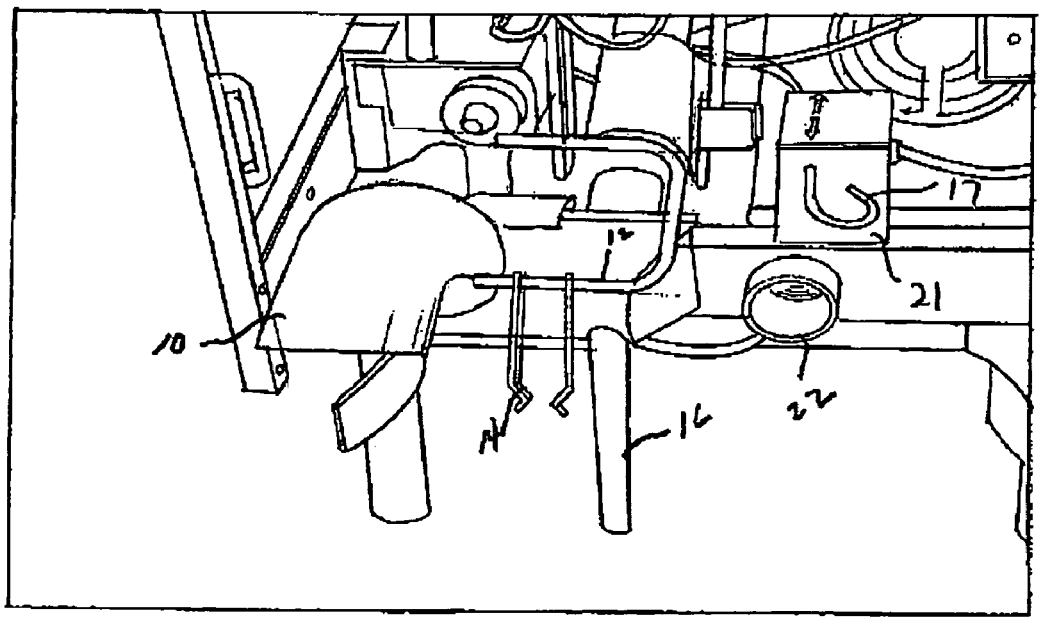
FIG. 2 is a view similar to FIG. 1 with the polish tube detached showing the slingable downspout in the vertical position prior to removal to clear a blockage.
Figure 3:
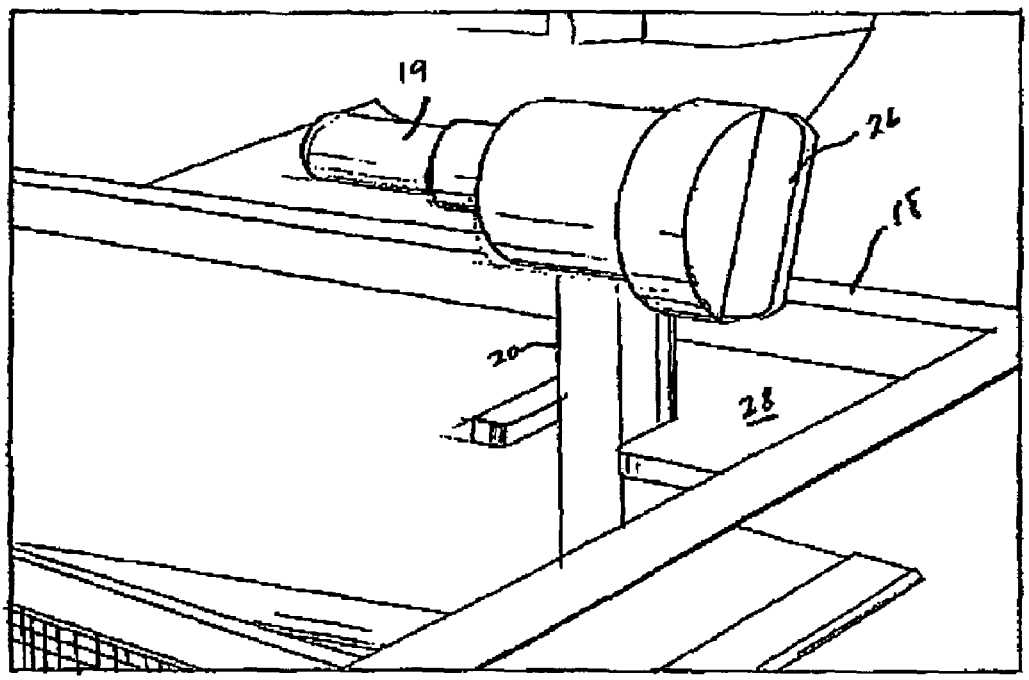
FIG. 3 is a fragmentary perspective view showing the assembled inline filter for the oil return.
Figure 4:
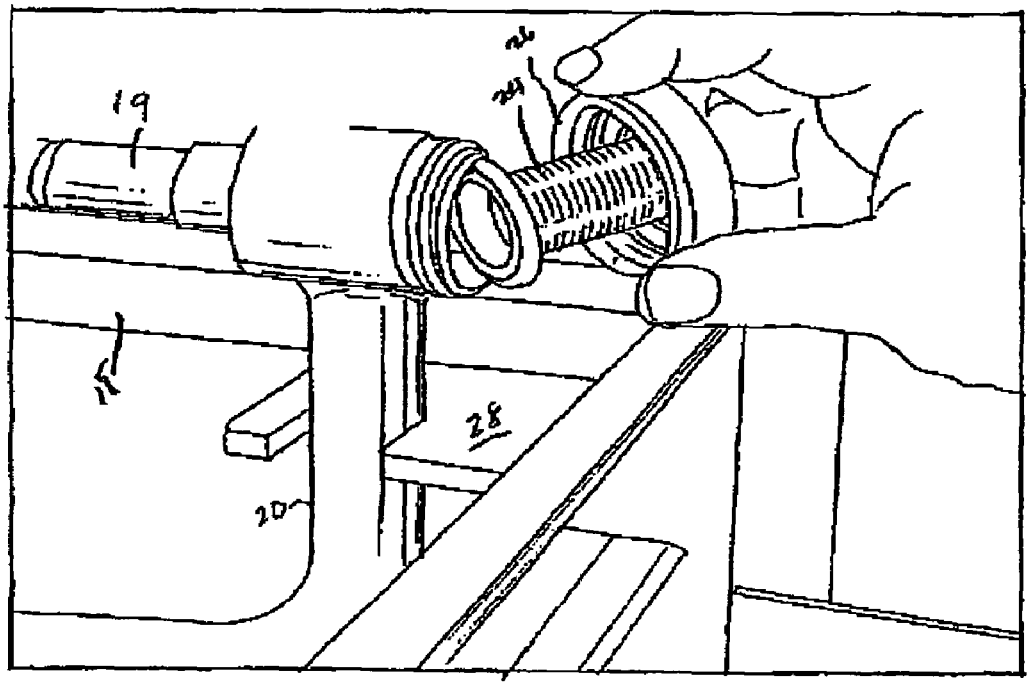
FIG. 4 is a view similar to FIG. 3 wherein the inline filter has been removed.
Figure 5:
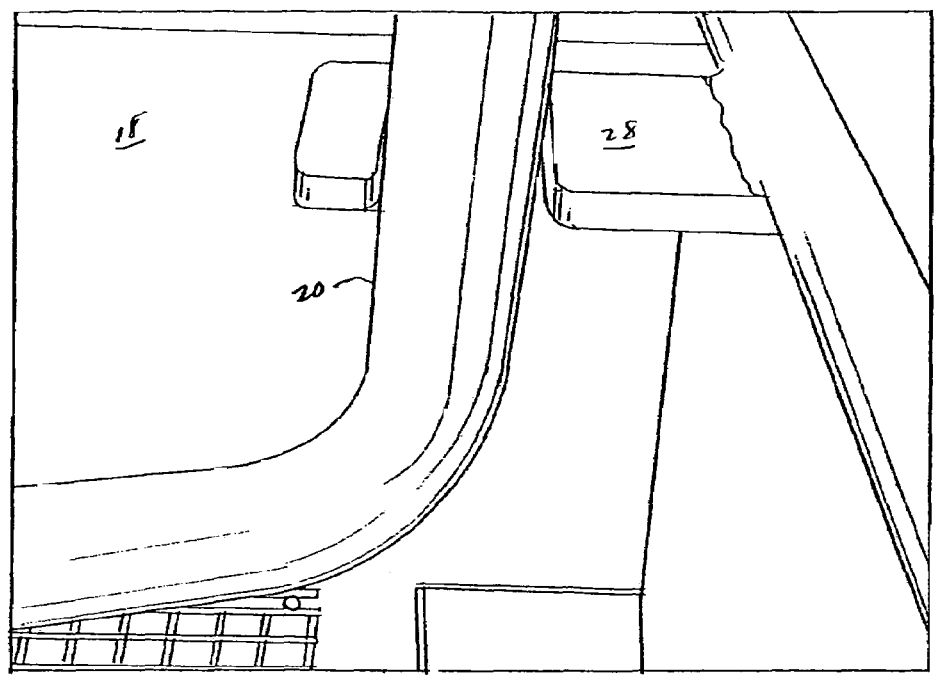
FIG. 5 is a fragmentary perspective view showing the U-shaped guide bracket for the oil return.

With attention to FIGS. 3-5, the filter pan 18 has an oil return pipe 19 which slidably engages a coupling 22 shown in FIGS. 1 and 2. Coupling 22 then is mounted at the end of the pipe 43 which is controlled by a pump 47 and filtered oil is returned through the pipe 19 and the remote pump to the cooking tank 123. See FIG. 10. Coupling 22 is a floating member not fixed to the chassis of the fryer for flexibility. An inline filter 24 is provided in the return pipe 19 and it is maintained within the pipe 19 by a threaded knob 26 so that it can be manually removed as shown in FIG. 4, periodically, for cleaning. The return pipe 20 is also supported by a U-shaped guide bracket 28. Return pipe 20 is slidably received In the U-shaped bracket 28 so that the pipe 20 can rise and fall as the filter is used, as will be subsequently explained.

Figure 6:
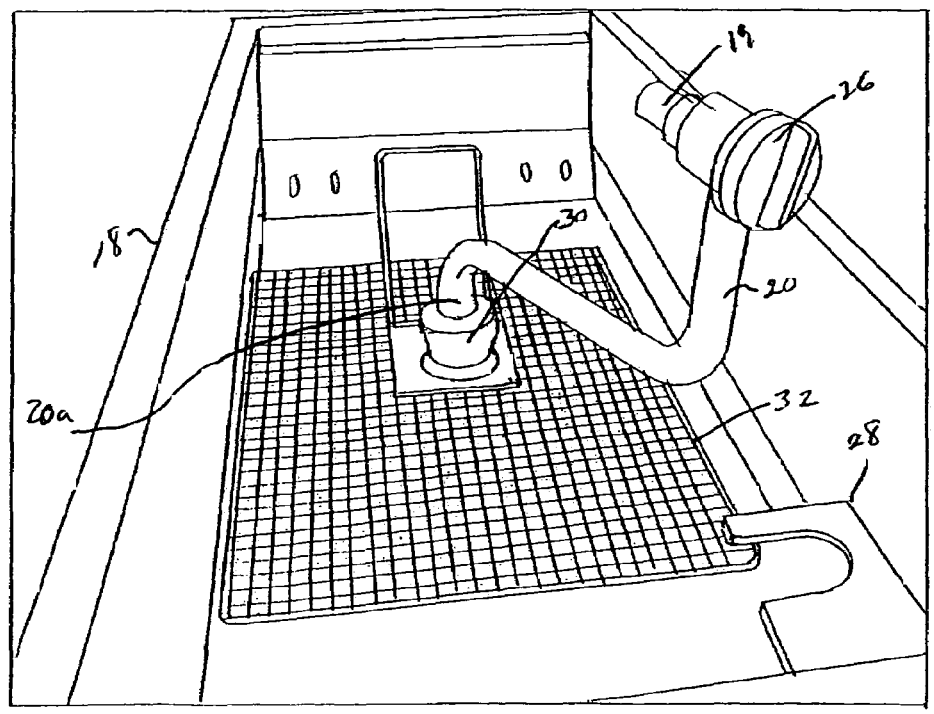
FIG. 6 is a fragmentary perspective view showing the filter assembly with the oil return removed from its U-shaped bracket.
Figure 7:
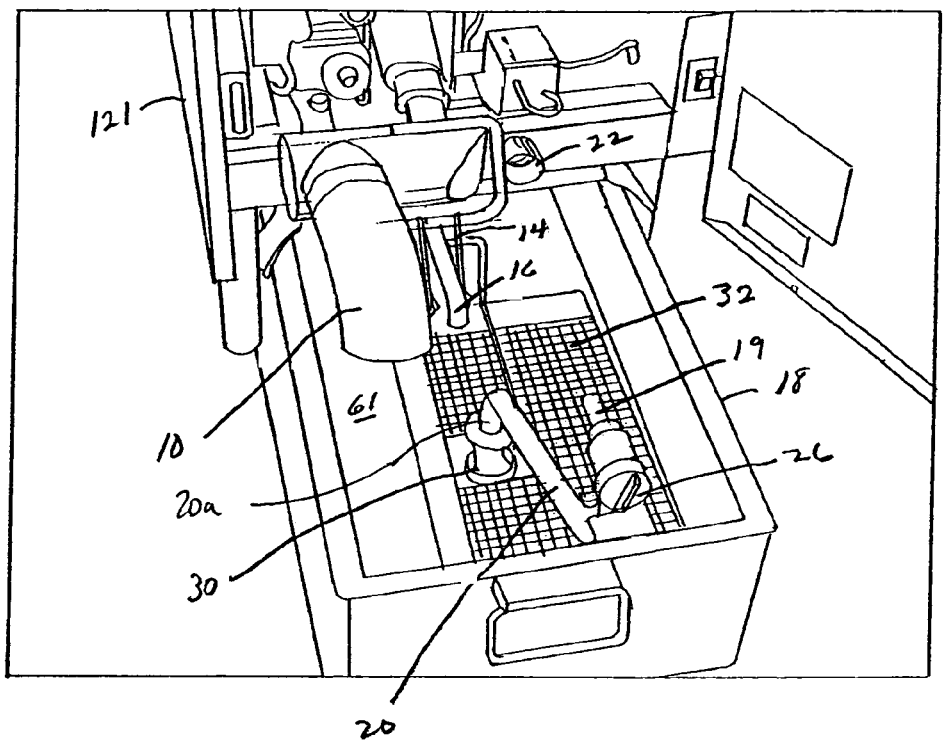
FIG. 7 is a view similar to FIG. 6 showing the filter assembly with the filter pan slidably removed from beneath the fryer and the crumb tray removed.
Figure 8:
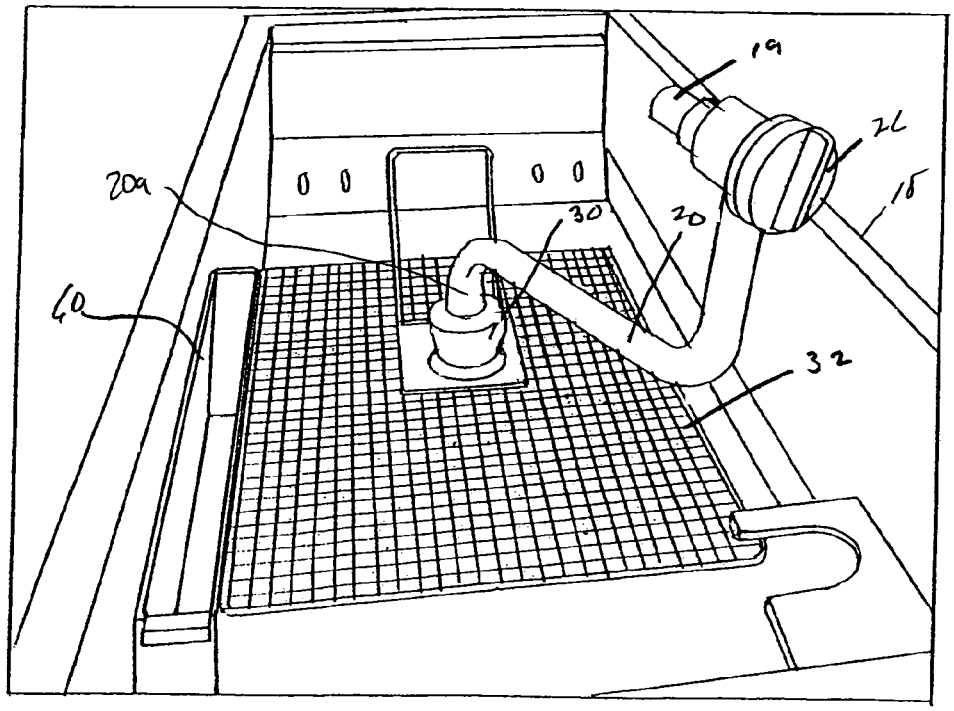
FIG. 8 is a view similar to FIG. 7 with the crumb tray present.

With attention to FIGS. 6-8 a first end 20a of return pipe 20 is attached by coupling 30 to a filter 32 in the bottom of pan 18. Filter 32 is typically steel mesh covered by a filter media (not shown) and filter oil is drawn by the pump (not shown) from beneath the filter 32. A filter cake then builds on the upper surface of filter 32. When the pan 18 is withdrawn, from beneath the fryer 121 the return pipe 19 is uncoupled from the return coupling 22, and coupling 30 is loosened to remove the first end 20a of pipe 20 from filter 32. The filter 32 can then be withdrawn from the filter pan 18. Typically the filter media (not shown) will be paper or cloth as described in the above related patent. Also, however, a filtering aid is typically used to promote a uniform build up of cake on the upper surface of the filter. Filtering aid is a particulate material such as diatomaceous earth which is an inert material, or preferably, a silicate such as Magnasol which is a reactive material. Magnasol is obtainable from Ciba Specialty Chemicals of Basil, Switzerland.

As will be apparent to those skilled in the art, it is necessary to avoid an uneven buildup of filter cake on the filter. In prior art lifter pans the oil to be filtered will be discharged directly onto the upper surface of the filter as the oil flows by gravity through a vertical downspout. The hot oil can then splash, and more particularly will clear away the filter aid material disposed on the upper surface of the filter paper or cloth. When such an area has been cleared of filter aid, the resistance to flow through the filter in that area will be greatly reduced and therefore the pump will draw the oil to be filtered through such cleared area, selectively, thereby eliminating the beneficial effects of a filter aid material. Downspout 10 is curved so that oil wiJi not directly Impact the filter. Such a direct impact could sweep away both accumulated cake and the filtering aid material. The rounded pipe also would minimize the chance of splashing.

Figure 9:
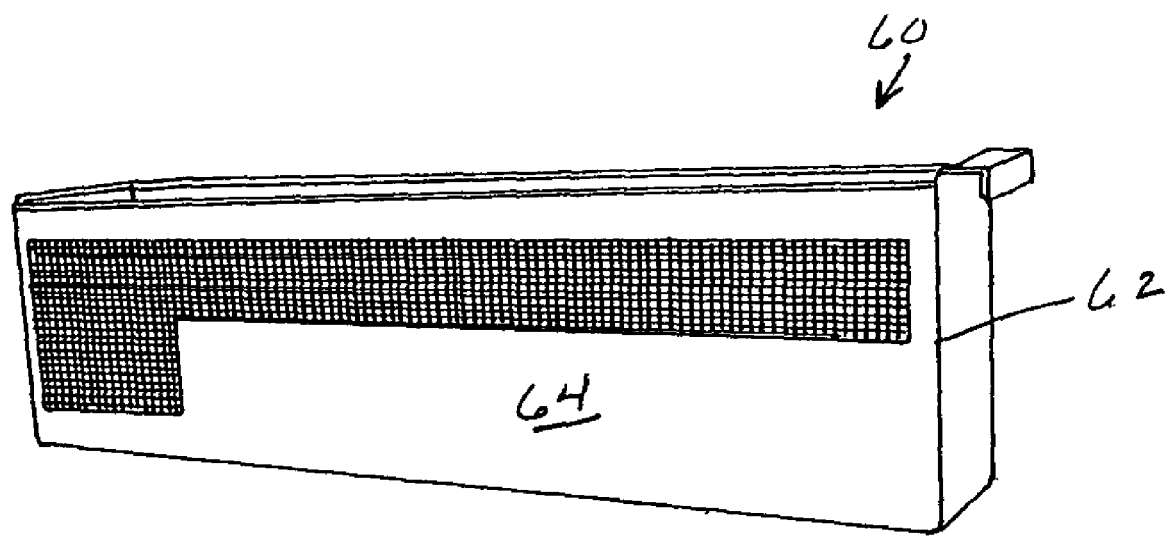
FIG. 9 is a perspective view of the crumb tray.

As also shown in FIGS. 8-9, a separate crumb tray 60 is provided In space 61 adjacent the filter 32. Oil from the downspout 10, which registers in the down position on tray 60, men flows directly into this crumb tray 60. The sides of the tray 62 are sufficiently vertically dimensioned by baffle 64 to insure that the oil to be filtered must pass above the sides in order to reach the filter thereby minimizing splashing and insure a more uniform flow onto the surface of filter 32. With the exception of baffle 64 the sides and bottom of tray 60 are primarily mesh.

After the filter pan 18 has been emptied, the process is reversed, the fryer tank refilled, and cooking resumed. It is important, however, that the polishing tube 16 extend well into the filter pan 18 so that the open end will be at least submerged in the oil to be filtered. In this way then during a polishing operation when oil is withdrawn from the filter pan 18 and recirculated for refiltering the oil will not be aerated. As noted above aeration should be kept to a minimum in order to avoid a break down of the oil or at least to delay the break down as long as possible.

The polishing operation according to embodiments of this invention has been found to drastically increase the life of the oil as follows:

In the prior art, oil would be pumped from the filter pan directly into the tank. Subsequently the tank would be emptied into the filter pan and the process repeated. In such an operation the oil was continually aerated as it poured into the tank. Aeration then facilitated the break down of food particles and cooking oils into undesirable side products which would then dictate frequent replacement of the oil.

In embodiments of the present invention, however, the polish tube 16 is preferably submerged within the oil to be filtered in the filter pan. When it is desired to polish, handle 17 is used to operate a by pass valve 21 to tank the return so that oil is pumped in a closed circuit from the filter pan through conduit 20, and returned directly to the filter pan through the polishing tube 16. When it is desired to return to cooking operation the handle 17 is then deactivated so that the oil from conduit 20 is returned directly to the tank without recycling further. Handle 17 thus acts to operate the by pass valve 21. Polishing according to this process twice daily for about one half hour has been found to dramatically lengthen the cooking time on a batch of oil.

Finally, as shown in FIG. 10, the fryer 121 which may have a lifting mechanism 44 for baskets 45, and may be equipped with a spigot 46 at one end of a pipe 48. The opposite end 50 of pipe 48 will be coupled to the pump 47 so that a small quantity of oil from the filter pan 18 can be diverted to the tank where it can be used to wash down the sides of the tank with a bucket or other container (not shown). Coupling 22 returns oil to pump 47 with piping 43.

In summary then the improvements in the filter system include a support clip for the rotatable downspout and a U-shaped support for the return pipe. Embodiments may also include an inline filter which is removable and is disposed in the return line which returns the filtered oil to the cooking tank in order to ensure any particles which remain in the filtered oil will not be returned to the tank.

The improvements in the filter system further include a closed polishing circuit wherein filtered oil can be refiltered without aeration and without first passing through the cooking tank.

In addition, a separate crumb tray is provided wherein the curved downspout will direct oil into the crumb tray which will then spill over onto the surface of the filter media to minimize splashing and to insure a more uniform flow of oil to be filtered across the face of the filter.

After reading the foregoing specification, one of ordinary skill will be able to effect various changes, substitutions or equivalents and various other aspects of the invention as broadly disclosed herein. It is therefore intended that the protection granted hereon be limited only by the definition contained in the appended claims and equivalents thereof.

The invention claimed is:

1. A filter system for it least one deep fat fryer, said filter system comprising:

a tank for containing oil and a drain fat said tank including a separately controlled outlet and a drain pipe in communication with said outlet, said drain pipe having a downspout;

a substantially rectangular open filter pan disposed below said downspout and a substantially flat filter horizontally disposed within said pan below said downspout, said filter being vertically movable within said pan;

a return for drawing filtered oil from said pad and returning said oil to said tank including a pump and a valve for directing filtered oil from the filter pan to said tank;

said return further including a take-up pipe having a first end releasably coupled to said filter and an opposite end in communication with said pump, said first end mounted to a swivel mounting carried by said pipe at said first end whereby when said end is uncoupled from said filter said pipe can be rotated;

a first switch coupled to the pump and the valve for simultaneously controlling the valve and the pump; and an inline filter disposed within said take-up pipe for further filtering said filtered oil from the filter pan before it is returned to said tank.

2. The system of claim 1 wherein said inline filter is removable from said pipe.

3. The system of claim 1 wherein said downspout has a curved end for directing oil downwardly at an acute angle to said filter and a rotatable handle whereby said downspout can be rotated from a downwardly directed first position and a horizontal second position.

4. The system of claim 1 wherein said return further includes a coupling slidably connecting said pickup pipe and said filter pan.

5. The coupling of claim 4 further comprising a U-shaped bracket.

6. The system of claim 3 wherein said downspout is slidably mounted on said drain pipe.

7. The system of claim 6 wherein said filter pan further comprises a crumb tray disposed below said downspout and beside said filter for receiving oil to be filtered and a baffle carried by said tray for directing said oil onto the upper surface of said filter.

8. The system of claim 3 further comprising a polishing circuit for recirculating filtered oil for refiltering without passing through said tank.

9. The system of claim 8 wherein the polishing circuit includes a tube rotatably mounted on said fryer and emptying into said filter pan, said tube rotatable between a downwardly directed first position and a horizontal second position.

10. The system of claim 9 further comprising a releasable stabilizer connecting said tube and said downspout whereby rotation of said downspout will rotate said tube simultaneously between said first and second positions.

11. The system of claim 10 wherein said stabilizer includes a clip releasably engaging said tube.

12. The system of claim 9 further comprising a second switch coupled to said pump and said valve for selectively directing the output of said pump to said tank or said tube.

* * * * *

UNITED STATES PATENT AND TRADEMARK OFFICE
CERTIFICATE OF CORRECTION

PATENT NO. : 7,311,038 B2  
APPLICATION NO. : 10/663717  
DATED : December 25, 2007  
INVENTOR(S) : Steven J. Savage et al.

Page 1 of 1

It is certified that error appears in the above-identified patent and that said Letters Patent is hereby corrected as shown below:

On the Title Page:

Item (73), delete "Frialater" and substitute --Frialator-- in its place.

In the Claims

Columns 5-6, in claim 1, line 3, after "oil and a drain" delete "fat" and substitute --for-- in its place.

Signed and Sealed this

First Day of July, 2008

JON W. DUDAS  
*Director of the United States Patent and Trademark Office*